United States Patent [19]

Wojtak et al.

[11] Patent Number: 4,802,053
[45] Date of Patent: Jan. 31, 1989

[54] CONTROL CIRCUITRY INCLUDING PHASE FAILURE RELAY

[75] Inventors: Roger C. Wojtak, St. Francis; John S. Hoelzer, Grafton; James T. Libert, Waukesha, all of Wis.

[73] Assignee: Square D Company, Palatine, Ill.

[21] Appl. No.: 24,640

[22] Filed: Mar. 11, 1987

[51] Int. Cl.⁴ .............................................. H02H 3/00
[52] U.S. Cl. ........................................ 361/85; 361/86; 361/92
[58] Field of Search .................... 361/76, 77, 85, 86, 361/92; 340/658, 663

[56] References Cited

U.S. PATENT DOCUMENTS 4,199,798 4/1980 Leppke et al. ...................... 361/92 X
4,458,283 7/1984 Iida ........................................ 361/76

Primary Examiner—A. D. Pellinen
Assistant Examiner—Derek S. Jennings
Attorney, Agent, or Firm—Richard T. Guttman; A. Sidney Johnston

[57] ABSTRACT

A system for sensing the phase of a three-phase AC system and detecting phase reversal and undervoltage and phase unbalance and for providing a switching function when the system is not functioning properly.

14 Claims, 3 Drawing Sheets

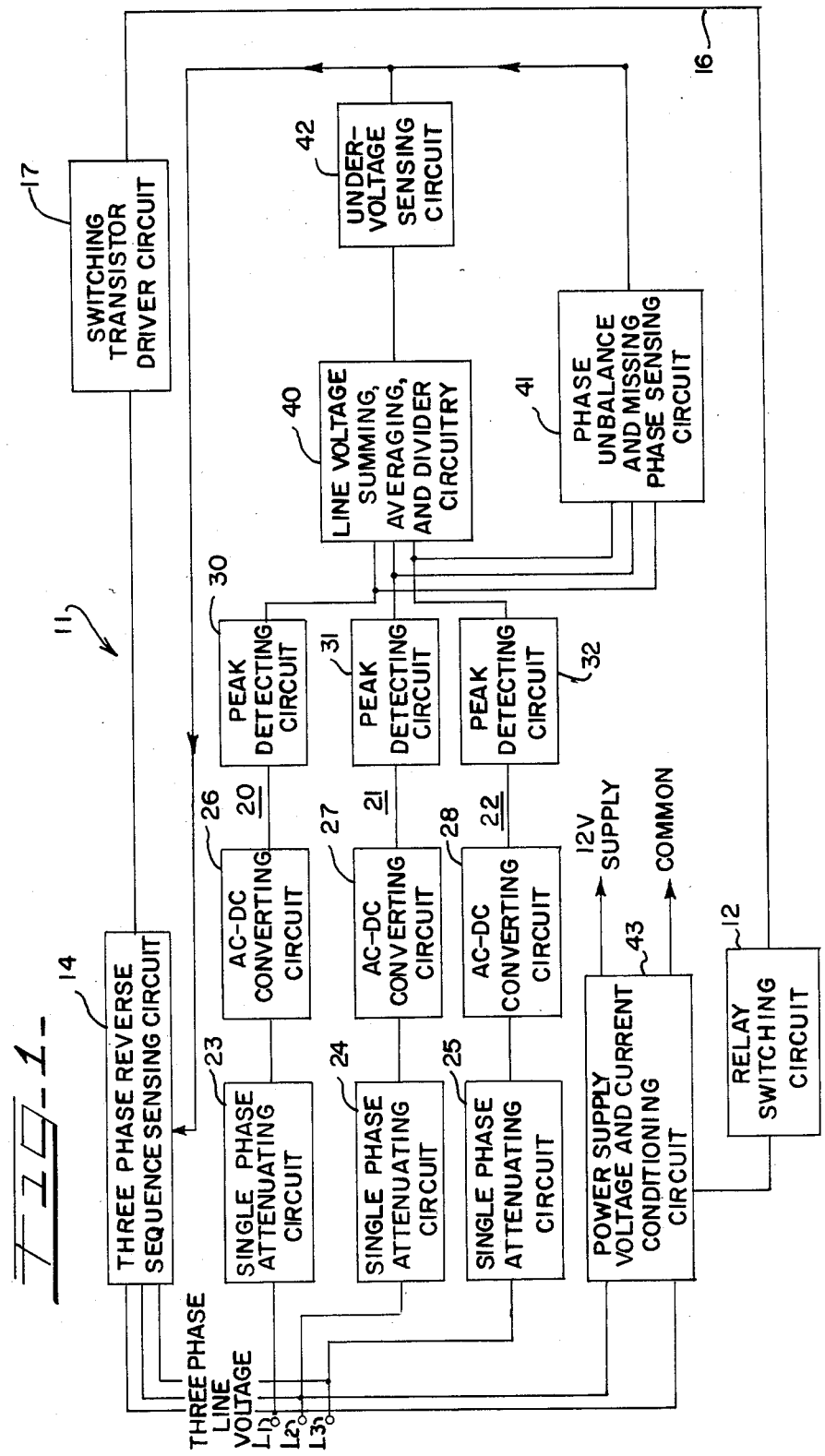

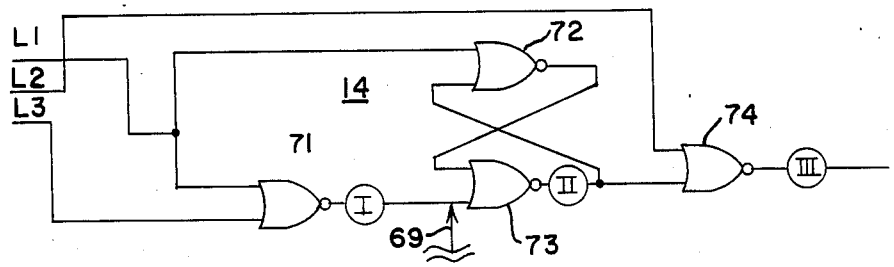
Fig-4
Fig-5
THREE PHASE VOLTAGE WAVEFORMS
(a) L1 
(b) L2 
(c) L3 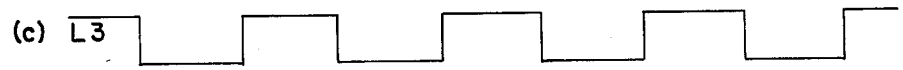
OUTPUT FOR SEQUENCE A-B-C
(d) I 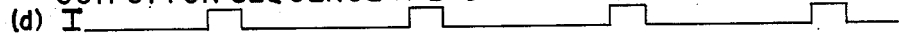
(e) II 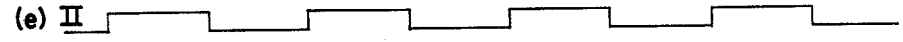
(f) III 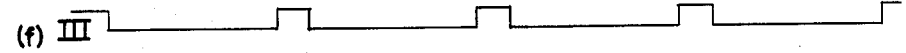
OUTPUT FOR SEQUENCE B-A-C
(g) I 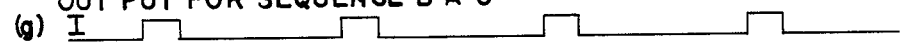
(h) II 
(i) III 
OUTPUT FOR SEQUENCE A-C-B
(j) I 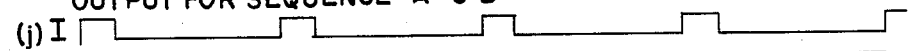
(k) II 
(l) III 
OUTPUT FOR SEQUENCE C-B-A
(m) I 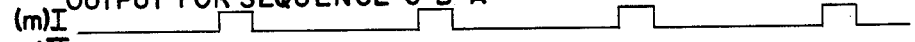
(n) II 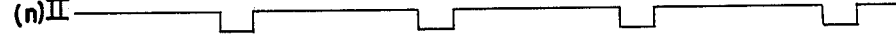
(o) III 

4,802,053

CONTROL CIRCUITRY INCLUDING PHASE FAILURE RELAY

DESCRIPTION

BACKGROUND OF THE INVENTION

Systems for monitoring electrical poly-phase equipment for phase-to-phase unbalance, reverse phase sequencing and variations in line voltage are known in the art.

It is known that unbalance of a three-phase power system will occur when single phase loads are applied or coupled to the system, causing one or two of the lines to carry more or less of the load. Excessive phase voltage unbalance causes three-phase motors to run at temperatures above their designated ratings. These high temperatures result in insulation breakdown and shortened motor life.

Three phase motors are designed to rotate clockwise for positive phase sequence and counterclockwise for negative phase sequence. Often only one direction of rotation of the motor is desired and reverse rotation of the motor may cause damage to the equipment designed only to run in one direction.

Operation of three-phase motors at a voltage less than the rated voltage results in higher load current. Since the heat generated due to resistance losses in the motor windings increases proportionately to the current squared (the $I^2R$ losses), insulation breakdown and shortened motor life may occur.

SUMMARY OF THE INVENTION

The present invention relates to control for a phase-failure sensing and switching relay including a three-phase voltage averaging comparator for continuously monitoring the three phase voltage to generate a DC output which is proportional to the average of the phase voltages, a voltage comparator for sensing the average phase voltage, a three-phase sequence detector for continuously monitoring the three-phase voltage, and a fault signal activator circuit coupled to selectively produce a fault signal whenever said comparator detects said average phase voltage is outside preset limits and whenever said phase detector detects a non-selected phase sequence.

BRIEF DESCRIPTION OF THE DRAWINGS

FIG. 1 is a block diagram of the inventive circuit;

FIG. 4 is a schematic diagram of the reverse sequencing circuit of FIGS. 1 and 2; and FIG. 5 shows waveforms useful in explaining the operation of the reverse sequencing circuit.

DETAILED DESCRIPTION OF THE INVENTION

Figure 3:
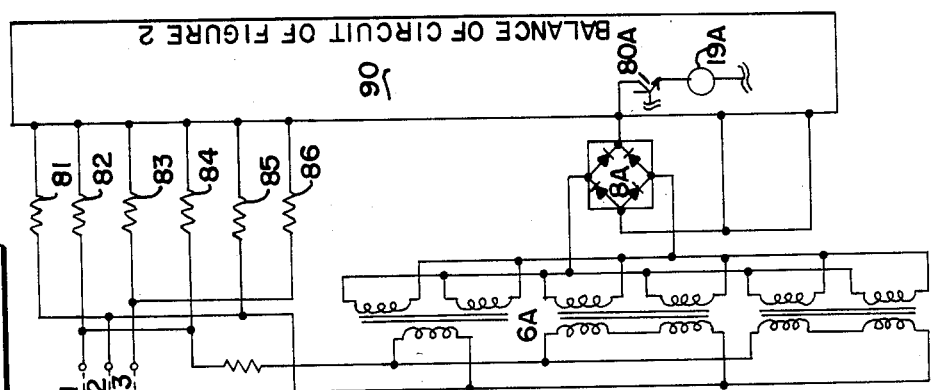
FIG. 3 is a diagram partially in block form of an alternative embodiment of the inventive circuit.

FIG. 1 is a block diagram of the inventive phase failure relay circuit or circuitry. Note that the phase failure relay circuit 11, as shown in FIG. 1, can be considered as separate subcircuits which all combine to control a relay switching circuit 12 (lower left hand portion of FIG. 1) in response to operating conditions of the associated three-phase system.

A first subcircuit comprises a three phase reverse sequence sensing circuit 14 which is coupled to a switching transistor driver circuit 17, which is in turn connected via lead 16 to relay switching circuit 12. The three-phase reverse sequence sensing circuit 14 receives a voltage input from each of the three single phase lines L1, L2 and L3; and provides an output indicative of the phase sequencing of the input lines, as will be described.

A second subcircuit group comprises the single-phase monitoring subcircuits 20, 21 and 22 each in turn including respective single phase attenuating circuits 23, 24 and 25; AC-DC converting circuits 26, 27 and 28; and, peak detecting circuits 30, 31 and 32. Each of the single phase monitoring circuits 20, 21 and 22 is connected to a respective line voltage L1, L2 and L3 and provides an output of the peak voltage on that particular line, as will be described.

The output from the three single-phase monitoring circuits 20, 21, and 22 is coupled to a another subcircuit comprising a line voltage summing, averaging and divider circuit 40. The output of the line voltage summing circuitry 40 is coupled to an undervoltage sensing circuit 42 which provides an output to deenergize the relay switch circuit 12 through lead 69 when an under voltage condition exists, as will be described. Also the output of the three single-phase monitoring circuits 20, 21 and 22 is coupled to a phase unbalance and missing phase sensing circuit 41. The output of the phase unbalance circuit 41 is coupled through lead 69 to deenergize the relay switching circuit 12 when phase unbalance occurs, as will be described.

Figure 2:
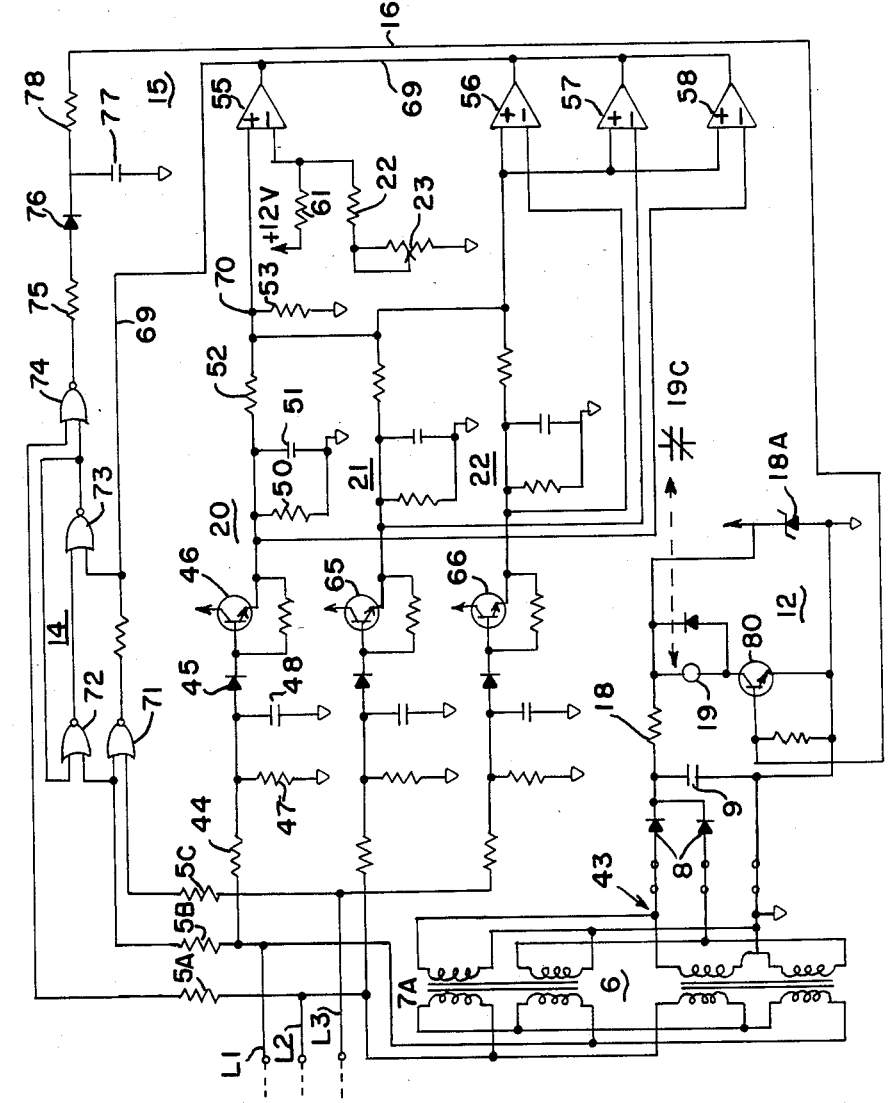
FIG. 2 is a schematic diagram of the circuit of FIG. 1.

A circuit 43 for providing power to the phase failure relay circuitry 11 is indicated in FIG. 1 and shown in more detail in FIG. 2. The A.C. line voltage from two lines L1 and L2 is coupled to a transformer 6 through leads 7A and 7B. The transformer steps the A.C. voltage into a lower A.C. voltage, which is then coupled to rectifying diodes 8 to provide a D.C. voltage. A filter capacitor 9 smooths the D.C. voltage, and a resistor 18 limits the current to a suitable level. A 12-volt zener diode 18A provides voltage limiting.

The function of the circuitry 11 of FIG. 1 is to monitor the three-phase line voltage and generate an output to deenergize the relay switching circuit 12 to switch or open its contacts (a) whenever the line voltage is below a preset level; (b) whenever the phases on the lines are not in proper sequence; or (c) whenever there is a phase unbalance or when a missing phase condition exists.

Refer now to FIG. 2 for an explanation of the undervoltage and phase unbalance function of the inventive circuit 11. FIG. 2 shows the detailed circuit diagram of the block diagram of FIG. 1. As mentioned above, a three-phase voltage is coupled as an input to the circuit 11 from distribution system lines L1, L2 and L3. The input from lines L1, L2 and L3 is coupled through resistor 44 and diode 45 to the base of NPN transistor amplifier 46 of subcircuit 20. Each of subcircuits 20, 21 and 22 are essentially identical to each other, hence a detailed description of subcircuit 20 applies also to subcircuits 21 and 22.

A resistor 47 connects to ground from the junction of resistor 44 and the anode of diode 45. Resistors 44 and 47 function as a voltage divider. A capacitor 48 connected in parallel with resistor 47 provides transient voltage filtering or smoothing, and protection. Diode 45 rectifies the A.C. and provides a half wave voltage to transistor amplifier 46. Amplifier 46 provides a current gain and prevents attenuation of the signal. The voltage from amplifier 46 is coupled across a parallel circuit comprising resistor 50 and capacitor 51, and thence through series resistor 52 to the upper terminal 70 of a parallel connected resistor 53. The other terminal of resistor 53 is coupled to ground; and hence resistor 53 functions as part of a voltage divider.

Note that each resistor in subcircuits 21 and 22 corresponding to series resistor 52 of subcircuit 20 is coupled to the same upper terminal 70 of resistor 53. The voltages from each of the subcircuits 20, 21 and 22 are thus averaged together across resistor 53 and coupled to a comparator 55. The ohmic value of resistor 53 is selected to set the voltage level at its upper terminal 70 at a 93% of average of the voltage levels on the three phase input lines L1, L2 and L3. The 93% level or limit is set to compensate for any circuit tolerance levels.

Comparator 55 monitors the undervoltage. The average voltage coupled to the non-inverting input terminal of comparator 55 from the upper terminal of resistor 53 tracks at 93% of the average of the three input lines L1, L2 and L3. The inverting input terminal of comparator 55 is connected to a variable voltage divider circuit comprising series connected resistors 61, 62 and 63 connected between a positive 12-volt supply and ground. Resistor 63 is a variable resistor and enables the undervoltage select to be linearly adjustable between the upper and lower voltage limits. Whenever the average voltage on lines L1, L2 or L3 falls below the selected level, the output of comparator 55 goes to a logic low, and will cause the relay switching circuit 12 to trip the failure relay 19, as will be explained.

To control phase unbalance, each individual voltage level at the output of the similar amplifiers 46, 65 an 66 of the subcircuits 20, 21 and 22 is coupled of the inverting input to respective comparators 56, 57 and 58. Note that the average voltage level of all three lines L1, L2 and L3 is coupled from terminal or junction point 70 to the non-inverting input of each of comparators 56, 57 and 58. The comparators 56, 57 and 58 thus compare voltage level on each of the lines L1, L2 and L3 with the average 93% input level of the lines L1, L2 and L3 obtained at terminal or junction point 70. If the level of any individual lines L1, L2 or L3 goes below the 93% level, the output of the respective comparator 56, 57 or 58 drops to logic low and will provide an output to cause the failure relay 19 to trip, as will be explained.

In operation, when the system is operating properly; that is, when the voltage on all the lines L1, L2 and L3 is at a proper level and the phases are all balanced, the outputs of all the comparators 55, 56, 57 and 58 will be at logic high. However, when the voltage level on one of the lines L1, L2 or L3 goes low, comparator 55, 56, 57, 58 goes to a logic low, and lead 69, which is connected to the output of comparator 55, 56, 57, 58, is pulled low, thereby coupling a logic low or zero voltage to the B lower terminal of NOR gate 73 of the reverse sequencing circuit 14. The A input of NOR gate 73 is alternating between logic 1 and logic 0 at line frequency, when the input to the B lower terminal of NOR gate 73 goes low, the output of gate 73 goes high, i.e. to a logic one. When the A input is high this couples a logic high to the B input lower terminal of NOR gate 74. With a logic high on the B lower input terminal of NOR gate 74, the output of gate 74 will be a logic low or zero. This will cause a low or zero voltage to be coupled through the switching transistor driver circuit 17 comprising resistor 75, diode 76, capacitor 77 and resistor 78 to lead 16 and the relay switching circuit 12, and thereby cause the failure relay 19 to trip as will be explained.

When the system is operating normally, the signal from AND subcircuit 15, comprising the wired or connected comparators 55, 56, 57 and 58, provides a composite output on lead 69 to provide a logic high output to the B input lower terminal of NOR gate 73 in the reverse sequencing circuit 14. This will cause reverse sequencing circuit 14 to couple a logic high output through lead 16 to the base of NPN transistor 80 of the relay switching circuit 12 to cause transistor 80 to conduct. Transistors 80 is connected in series with the winding of power relay 19 and operates as an ON-OFF switch. Thus when transistor 80 conducts, it will in effect switch relay 19 ON; that is, current will flow through the windings of relay 19 and cause the associated relay contacts 19C to close. When an improper voltage is present at any one of the lines L1, L2 or L3, the output from the AND subcircuit 15 at lead 69 will go low and hence the output of reverse sequencing circuit 14 will also go low, thereby causing transistor 80 to turn off, and accordingly, current can no longer flow through relay 19. Relay contacts 19C will therefore trip or open thereby actuating the relay failure mechanism.

Refer now to FIG. 2 and also to FIGS. 4 and 5 for a more detailed description of the three phase reverse sequence sensing circuit 14. Three-phase voltage from lines L1, L2 and L3 is applied to an integrated circuit chip, which may be of any suitable known type and which includes a group of NOR gates 71, 72, 73 and 74, comprises sensing circuit 14. Resistors 5A, 5B and 5C connected in series in the respective lines L1, L2 and L3 limit the current to protect the integrated circuit chip which contains the NOR gates, four of which are used herein. The voltages to gates 71, 72, 73 and 74 are clipped at about the power supply voltage by internal diodes, not shown, in the integrated circuit chip. Thus the circuit receives a series of square waves with maximums at the power supply voltage as shown by the waveforms in lines a, b and c of FIG. 5. The Roman numeral designation in the circles of FIG. 4 refer to the waveforms in FIG. 5. Thus, the waveforms labeled I in FIG. 5 represent the output of gate 71 (at circle I) in FIG. 4; and the waveforms labeled III in FIG. 5 represent the output of gate 74 in FIG. 4.

NOR gate 72 and 73 are connected as a one-shot multivibrator or flip-flop unit. When the correct phase sequence, that is phase sequence A-B-C, is applied, gates 72 and 73 will cause the output at gate 73 to be low. When the output at gate 73 is low, it couples a low input to the B input of NOR gate 74 and provides positive pulse output through resistor 75, diode 76, resistor 78 and lead 16 to the base of transistor 80 causing transistor 80 to conduct. This low output from gate 74 is provided 5/6 of the time as shown in lines d, e and f of FIG. 5 when the correct phase sequence is applied. The switching transistor driver circuit 17 comprising resistor 75, diode 76, capacitor 77 and resistor 78 provide current limiting and create a filter so that the output current is a stable D.C. of a level sufficient to turn ON transistor 80 as required.

When an incorrect sequence is applied, the multivibrator comprising gates 72 and 73 does not latch; thus the output of the flip-flop gates 72 and 73 stays high 5/6 of the time (lines h, k and n of FIG. 5), and the output of gate 74 stays low (lines i, 1 and o of FIG. 5).

Hence, so long as the voltage at the output of gate 74 at the output terminal of the reverse sequencing circuit 14, that is, at the terminal labeled III in FIG. 4, goes high at least 1/6 of the time as shown in the waveform labeled output for sequence A-B-C (lines d, e and f of FIG. 5), the switching transistor 80 will remain ON and relay 19 will stay closed.

Note from the waveforms labeled output for sequence B-A-C in lines g, h and i of FIG. 5, and output for sequence A-C-B in lines j, k and l of FIG. 5 or the output for sequence C-B-A in lines m, n and o in FIG. 5, that in any other sequence but the sequence A-B-C, the output of gate 74 remains low and causes the transistor 80 to become non-conducting or turn OFF.

As seen from FIG. 1, the line 69 connecting all the outputs of the comparators 55, 56, 57 and 58 together goes to the B input the lower terminal of gate 74. When all is correct, the four outputs from the comparators go to a high and impedance thereby do not affect the NOR logic. However, when a fault or trip condition occurs, any one of the comparators can pull the respective line low putting a logic zero onto the B input lower terminal of gate 73. If this input to gate 73 is zero, then the output of the gate 73 will be a logic one or high when the A input toggles to logic zero. With a logic high on the input of gate 74, the output of gate 74 will be a logic low. This will provide a low voltage signal to relay switching circuit 12 and will cause the failure relay 80 to open or trip and remain open.

Phase loss is essentially a severe case of phase unbalance and as such is detected in the same manner as phase unbalance. Further, if phase A or B of lines L1 and L2 is lost, power to the transformer 6 is interrupted, and the device power supply 43 will not function, shutting down the entire circuit 11 and, of course, dropping out the failure relay 19.

FIG. 3 shows an alternative embodiment of the circuit of FIGS. 1 and 2. In FIG. 3, the block 90 comprises the various circuits of FIG. 2 including the reverse sequencing circuit 14, the phase monitoring circuits 20, 21, 22, the AND subcircuit 15, and the relay switching circuit 12. In FIG. 3, the power supply includes a large transformer 6A and a full wave bridge rectifier 8A, which are employed to provide a larger amount of current. In FIG. 3, the relay 19A is relatively larger than relay 19 connected to the emitter of transistor 80A which has a larger gain than transistor 80 of FIG. 2. Transistor 80A thus provides the increased current to run the larger relay 19. This allows the relay 19A to draw its power from the unregulated supply while maintaining the proper coil voltage. Resistors 81-86 in FIG. 3 are larger resistors, and each resistor may comprise two resistors connected in series. The higher voltages that have to be reduced require larger two-watt resistors; hence two resistors in series may be used since single resistors with adequate voltage rating are not readily available.

As shown in FIG. 2, only one transformer 6 is used at a time, depending upon the power line voltage on lines L1, L2, L3. As shown in FIG. 3, only one transformer 6A is used at a time depending upon the voltage supplied on lines L1, L2, L3.

The remainder of the circuitry of FIG. 3 is substantially the same and operates the same as the circuitry of FIG. 2, each circuit providing the same result for their rated output.

While the invention has been particularly shown and described with reference to a preferred embodiment thereof, it will be understood by those skilled in the art that various changes in form and details may be made therein without departing from the spirit and scope of the invention.

We claim:

1. A control circuit for controllably interrupting power to a load through a switching relay, in response to a fault signal, by monitoring the voltages on a certain number of polyphase AC power lines each carrying a separate phase voltage, said circuit comprising:
    (a) averaging means for producing an average signal that is an average of the peak values of all of said phase voltages;
    (b) a plurality of comparator means, at least one comparator means for each polyphase power line, each of said comparator means having one input coupled to said average signal and another input coupled to a related polyphase power line, said comparator means for producing an imbalance signal in response to a voltage of said related power line being compared to said average signal; and
    (c) fault signal means producing said fault signal in response to an imbalance signal from at least one comparator means.

2. The control circuit of claim 1 further including average voltage comparator means having one input coupled to said averaging signal and another input coupled to a fixed voltage reference for producing an average-voltage out-of-range signal in response to a chosen difference between said average signal and said fixed voltage reference, said fault signal means including means for producing said fault signal in response to sid out-of-range signal.

3. The control circuit of claim 2 wherein said difference is chosen to produce said out-of-range signal in response to power line average peak voltage below a chosen value.

4. The control circuit of claim 1 further including phase sequence detector means responsive to the phase sequencing of the voltage on said lines and to said imbalance signal from said comparator means for producing an improper-phase signal at least when a phase sequencer other than a chosen sequence occurs on said lines, said fault signal means including means for producing said fault signal in response to said improper-phase signal.

5. The control circuit of claim 1 further including connection means for producing a WIRED AND connection of said imbalance signals, said fault signal means producing said fault signal in response to an imbalance-indicating signal from said connection means.

6. The control circuit of claim 1 further including average voltage comparator means having one input coupled to said averaging signal and another input coupled to a fixed voltage reference for producing an average-voltage out-of-range signal in response to a chosen difference between said average signal and said fixed voltage reference, connection means for producing a WIRED AND connection of said imbalance signals and said out-of range signal, said fault signal means producing said fault signal in response to either an out-of-range-indicating signal or an imbalance-indicating signal from said connection means.

7. A control circuit for controllably interrupting power to a load through a switching relay, in response to a fault signal, by monitoring the voltages on a certain number of polyphase AC power lines each carrying a separate phase voltage, said circuit comprising:
    A. plural comparator means, each for producing a comparison signal in response to a voltage of a related power line being compared to an average of said power line voltages;
B. connection means for producing a WIRED AND connection of said comparison signals; and
C. fault signal means producing said fault signal in response to any one comparison signal from said comparator means appearing on said WIRED AND connection.

8. The control circuit of claim 7 further including averaging means for producing an average signal that is an average of the peak values of all of said phase voltages, each of said plural comparator means having one input coupled to said average signal and another input coupled to a related polyphase power line and producing an imbalance-indicating comparison signal in response to a voltage of said related power line being compared to said average signal.

9. The control circuit of claim 8 further including average voltage comparator means having one input coupled to said averaging signal and another input coupled to a fixed voltage reference for producing an average-voltage out-of-range signal in response to a chosen difference between said average signal and said fixed voltage reference, said connection means producing a WIRED AND connection of said plural comparator means and said average voltage comparison means to cause said fault signal means to produce said fault signal in response to said out-of-range signal.

10. The control circuit of claim 9 wherein said difference is chosen to produce said out-of-range signal in response to power line average peak voltage below a chosen value.

11. The control circuit of claim 8 further including phase sequence detector means responsive to the phase sequencing of the voltage on said lines and responsive to said comparison signal from said comparator means for producing an improper-phase signal at least when a phase sequence other than a chosen sequence occurs on said lines, said fault signal means including means for producing said fault signal in response to said improper-phase signal.

12. The control circuit of claim 7 in which said comparator means produce said comparison signal in response to said voltage of said related power line being less than said average by a chosen amount.

13. A control circuit for controllably interrupting power to a load through a switching relay, in response to a fault signal, by monitoring the voltages on a certain number of polyphase AC power lines each carrying a separate phase voltage, said circuit comprising:
(a) averaging means for producing an average signal that is an average of the peak values of all of said phase voltages;
(b) a plurality of comparator means, at least one comparator means for each polyphase power line, each of said comparator means having one input coupled to said average signal and another input coupled to a related polyphase power line, said comparator means for producing an imbalance signal in response to a voltage of said related power line being compared to said average signal;
(c) connection means for producing a WIRED AND connection of said imbalance signals; and
(d) fault signal means producing said fault signal in response to an imbalance signal from at least one comparator means.

14. A control circuit for controllaby interrupting power to a load through a switching relay, in response to a fault signal, by monitoring the voltages on a certain number of polyphase AC power lines each carrying a separate phase voltage, said circuit comprising:
A. a converting circuit for each of said power lines, each converting circuit including a diode rectifier and transistor receiving the voltage on said power line and producing a DC line signal corresponding to the instantaneous voltage on said power line;
B. a first capacitor for each power line, each said first capacitor receiving a related DC line signal and retaining a peak voltage representing the peak voltage on a related power line;
C. a second capacitor coupled to the peak voltages on each of said first capacitors for forming an average peak voltage of the voltages on said power lines;
D. a comparator for each power line, each said comparator having one input coupled to said average peak voltage on said second capacitor and another input coupled to a related peak voltage on one of said first capacitors, each said comparator producing an imbalance signal in response to said related peak voltage being a certain amount below said average peak voltage;
E. a connection of leads from said comparators effecting a WIRED AND connection of said imbalance signals; and
F. fault signal means producing said fault signal in response to an imbalance signal from any one of said comparators.

* * * * *